(12) United States Patent
Lewallen et al.

(10) Patent No.: US 7,429,136 B2
(45) Date of Patent: Sep. 30, 2008

(54) CONNECTOR ASSEMBLY HAVING MULTI-FIBER FERRULE WITH FORCE CENTERING

(75) Inventors: Christopher Paul Lewallen, Hudson, NC (US); James P. Luther, Hickory, NC (US); Thomas Theuerkorn, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/546,232

(22) Filed: Oct. 11, 2006

(65) Prior Publication Data

US 2008/0089651 A1 Apr. 17, 2008

(51) Int. Cl.
G02B 6/38 (2006.01)
(52) U.S. Cl. ...................................................... 385/71
(58) Field of Classification Search ............. 385/55–60, 385/66–69, 76–78, 84–86, 71
See application file for complete search history.

(56) References Cited

U.S. PATENT DOCUMENTS

| 3,922,064 | A | * | 11/1975 | Clark et al. ................... 385/54 |
| 5,214,830 | A | | 6/1993 | Rozycki ....................... 29/240 |
| 5,590,229 | A | | 12/1996 | Goldman et al. .............. 385/59 |
| 6,439,780 | B1 | * | 8/2002 | Mudd et al. ................... 385/83 |
| 6,811,322 | B2 | | 11/2004 | Chen et al. .................... 385/78 |
| 2002/0106163 | A1 | | 8/2002 | Cairns ......................... 385/60 |
| 2005/0024532 | A1 | | 2/2005 | Chen et al. .................... 385/78 |
| 2005/0069264 | A1 | * | 3/2005 | Luther et al. .................. 385/59 |
| 2007/0025665 | A1 | | 2/2007 | Dean, Jr. et al ............... 385/78 |

FOREIGN PATENT DOCUMENTS

WO WO97/34176 9/1997

* cited by examiner

Primary Examiner—Quyen Leung
(74) Attorney, Agent, or Firm—Jeffrey S. Bernard; John L. Haack

(57) ABSTRACT

A fiber optic connector assembly comprising a connector housing, at least one multi-fiber ferrule maintained within the connector housing, the at least one multi-fiber ferrule defining a front end for presenting at least one optical fiber for optical connection with at least one other mating ferrule and a rear end for inserting the at least one optical fiber into the ferrule, and a biasing member maintained within the connector housing operable for providing a biasing force to the multi-fiber ferrule, wherein the biasing force is not applied to the rear end of the multi-fiber ferrule. A connector assembly including a 72 fiber ferrule and force centering structure for applying on-axis force to the ferrule, while preventing off-axis forces generated by a biasing spring from being applied to the ferrule.

37 Claims, 15 Drawing Sheets

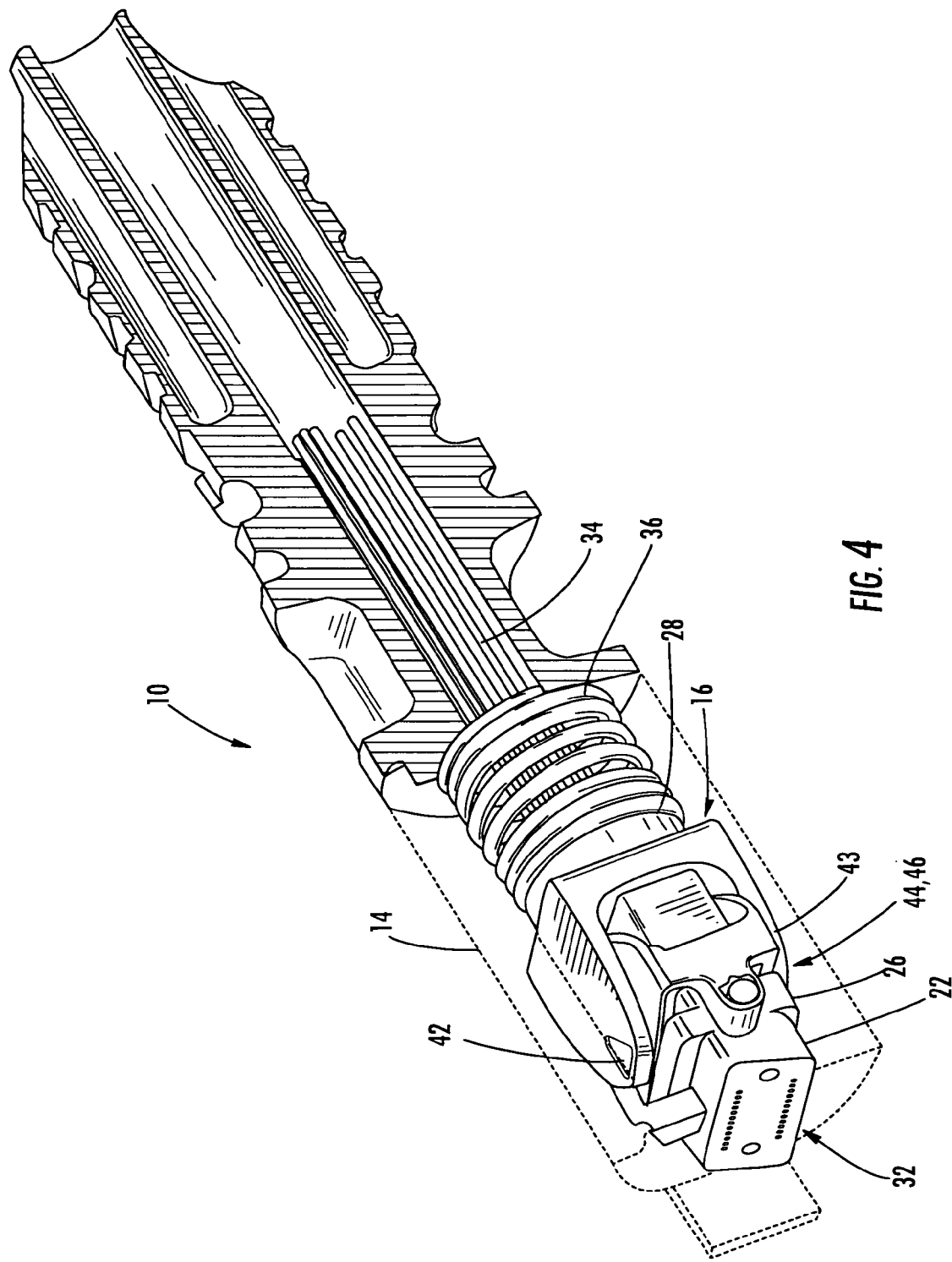

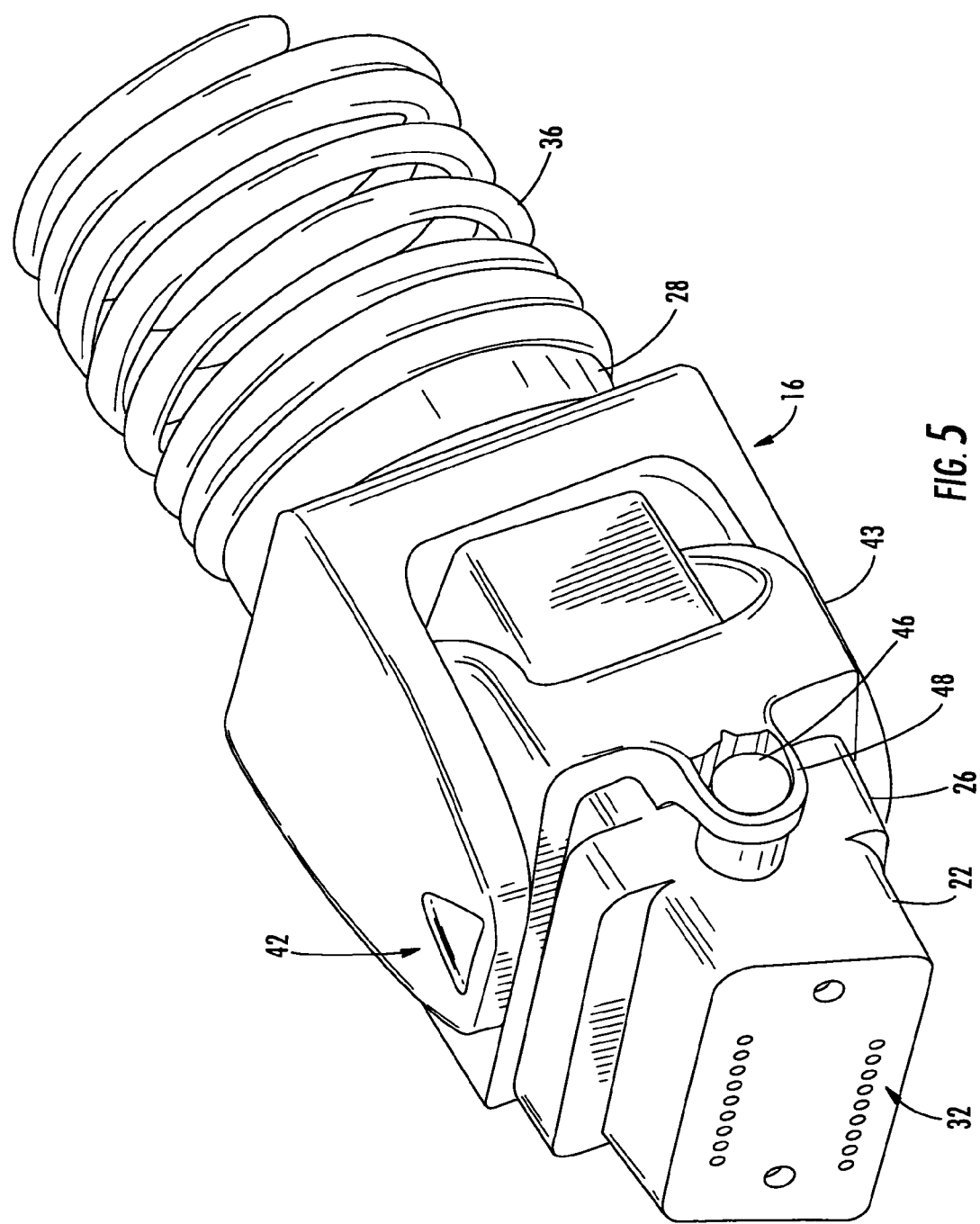

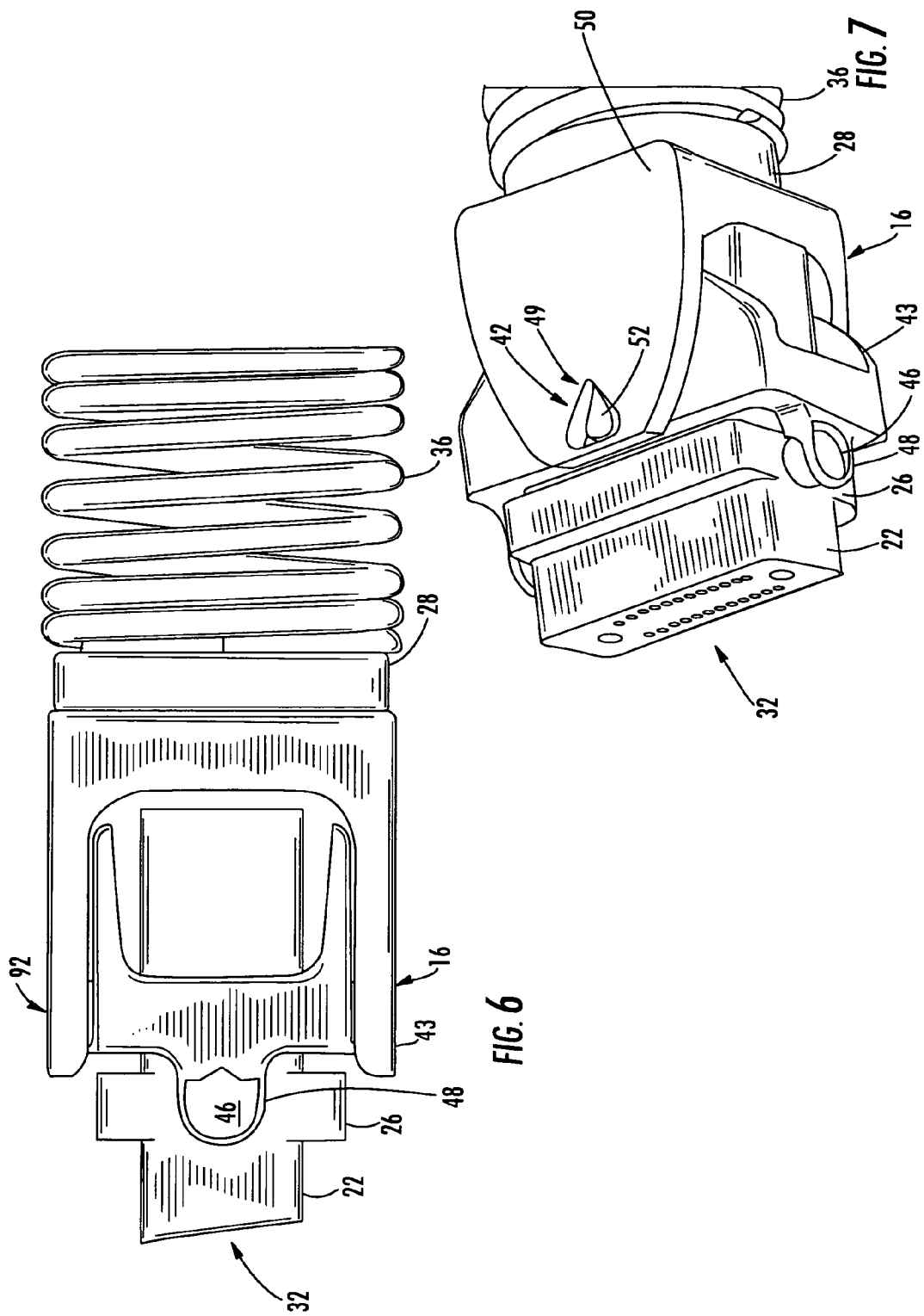

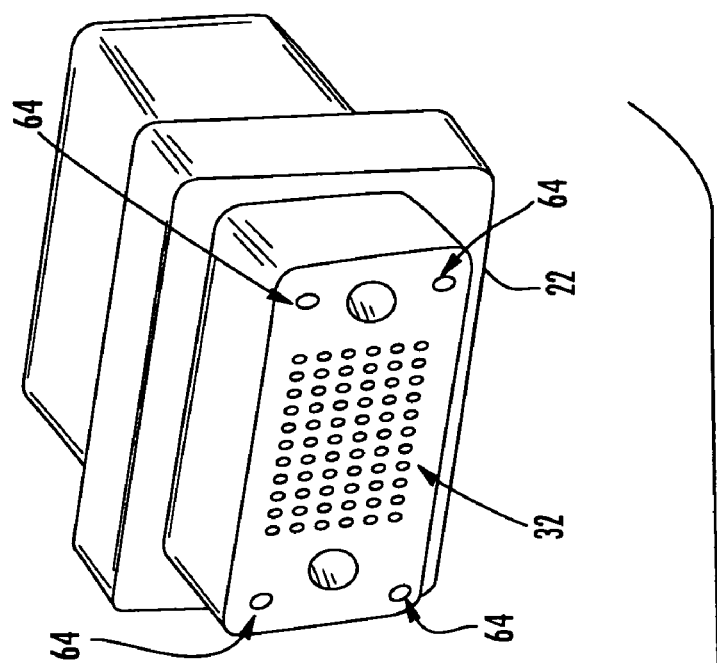
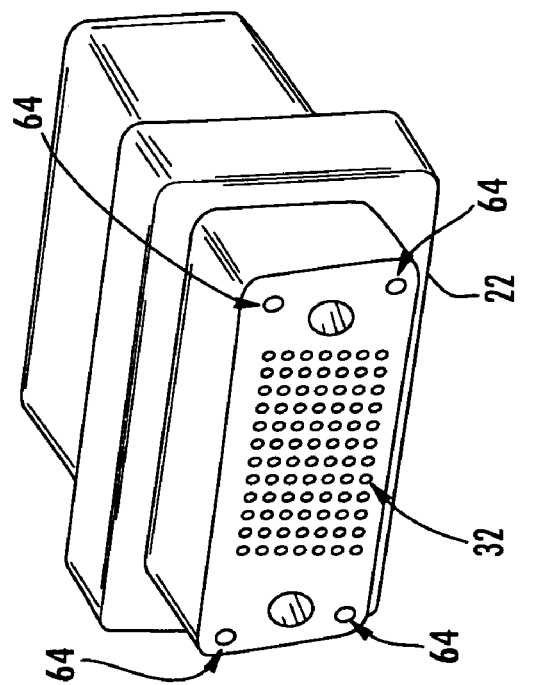
FIG. 14

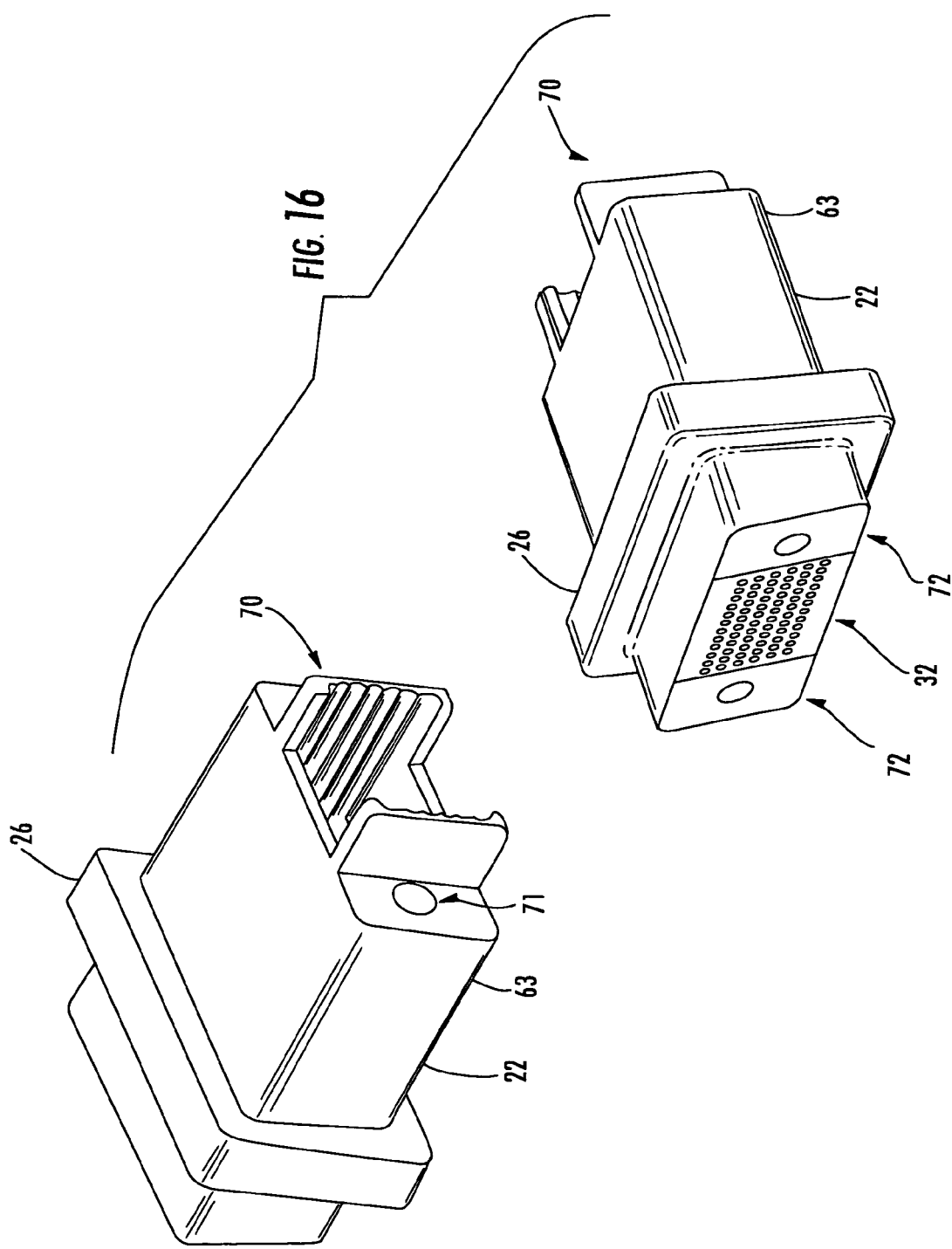

CONNECTOR ASSEMBLY HAVING MULTI-FIBER FERRULE WITH FORCE CENTERING

BACKGROUND OF THE INVENTION

1. Field of the Invention

The present invention relates generally to a multi-fiber connector assembly for use within a fiber optic network, and more specifically, to a multi-fiber connector assembly including a multi-fiber ferrule, force centering structure and guard fibers to facilitate polishing.

2. Technical Background of the Invention

The development of fiber optic networks has created the need for readily connecting a plurality of optical fibers simultaneously at a single connection point. In this regard, multi-fiber ferrules are being developed to mate large numbers of optical fibers to deliver "fiber-to-the-curb" (FTTC), "fiber-to-the-business" (FTTB), "fiber-to-the-premises" (FTTP), and "fiber-to-the-home" (FTTH), collectively referred to generically herein as "FTTx."

Fiber optic plug assemblies are typically mounted onto the ends of optical fiber cables. Single fiber connectors are typically used to terminate single fiber drop cables, while multi-fiber connectors are typically used to terminate cables include large numbers of individual optical fibers, and more commonly, ribbon fibers. Plug assemblies are typically received and aligned within adapter sleeves retained within fiber optic receptacles. In the case of multi-fiber ferrules, they are typically grossly aligned within receptacles and precisely aligned using guide pins retained within guide pin bores defined in the ferrule end face. Typically, ferrules of like configuration are mated and one mating connector is pre-loaded with the guide pins and the other mating ferrule defines guide pin bores for receiving the guide pins of the other ferrule during mating. Ferrules are also typically biased within the plug assemblies, thus allowing some movement of the ferrule during mating. Typically, plug assemblies include a substantially cylindrical plug body including the ferrule disposed within the plug body. In various connectors, the end of the plug body is open, or is provided with one or more openings, such that the ferrule is accessible within the plug body, such as to be cleaned, etc.

Several different types of conventional connectors have been developed, examples of which include, but are not limited to, SC, ST, LC, DC, MTP, MT-RJ, and SC-DC connectors. The size and shape of the ferrule of each of these connectors are somewhat different. Correspondingly, the size and shape of the alignment sleeve and plug body of each of these connectors are somewhat different. As a result, different receptacles and plugs are used in conjunction with different connectors and/or ferrules. In this regard, the receptacles typically define different sized and shaped internal cavities corresponding to the different sizes and shapes of the alignment sleeves and plug bodies received therein, and, in turn, corresponding to the different sizes and shapes of the ferrules of the connectors to be inserted into the alignment sleeves.

In addition to requiring the use of different receptacles and plugs based on the particular type of connector, conventional receptacle and plug assemblies are typically not compact enough to accommodate high density installations. Likewise, conventional smaller receptacle and plug assemblies are typically not able to withstand the relatively high tensile loads required for FTTx installations and are not able to handle mass interconnections. Exposure to adverse environmental conditions is also a significant issue as current network plans suggest that receptacles may remain unoccupied (i.e. without mated plugs) for an extended period of time. Thus, all receptacle and plug assemblies must be strong, durable, and robust.

As of yet, however, there is an unresolved need for a receptacle and plug assembly that utilizes an multi-fiber ferrule that can accommodate one or more stacks of fiber optic ribbon. There is also an unresolved need for a receptacle and plug assembly in which the ferrules and ferrule holders are "force centered" and "balanced," such that the end faces of the ferrules are precisely aligned with one another during mating. This may be accomplished using the internal structure of a plug assembly. Further, there is an unresolved need for a receptacle and plug assembly that utilizes an multi-fiber ferrule with respect to which all of the optical fibers may be polished evenly, as current configurations often result in the "over polishing" of optical fibers disposed near the edges.

SUMMARY OF THE INVENTION

In various embodiments, the present invention provides a receptacle and plug assembly that utilizes a multi-fiber ferrule, such as a 72-fiber ferrule or the like, the 72-fiber ferrule having 6 rows of 12 optical fibers each, for example, and that accommodates multiple stacks of fiber optic ribbon. The present invention also provides a receptacle and plug assembly in which the ferrules and ferrule holders are "force centered" and "balanced," such that the end faces of the ferrules are precisely aligned with one another. This is accomplished via pivot points and axes, ferrule shoulder locations, various spring configurations, various bridging sleeves, etc. The present invention further provides a receptacle and plug assembly that utilizes a multi-fiber ferrule with respect to which all of the optical fibers may be polished evenly, preventing the "over polishing" of optical fibers disposed near the edges. Finally, the present invention provides a receptacle and plug assembly that, in some instances, utilizes a "bootless" ferrule.

In one embodiment, the present invention provides a connector including a housing; an alignment sleeve disposed within the housing; a ferrule holder disposed within the alignment sleeve; and a ferrule comprising one or more optical connection points coupled to the ferrule holder; wherein the ferrule holder is configured such that the ferrule pivots about a vertical axis and a horizontal axis of the ferrule holder. Optionally, the vertical axis and the horizontal axis of the ferrule holder are substantially separated. Alternatively, the vertical axis and the horizontal axis of the ferrule holder are substantially co-planar.

In another embodiment, the present invention provides a connector including a housing; an alignment sleeve disposed within the housing; a ferrule holder disposed within the alignment sleeve; and a multiple termination ferrule comprising a plurality of optical connection points coupled to the ferrule holder; wherein the ferrule holder is configured such that the ferrule pivots about a vertical axis and a horizontal axis of the ferrule holder. Optionally, the vertical axis and the horizontal axis of the ferrule holder are substantially separated. Alternatively, the vertical axis and the horizontal axis of the ferrule holder are substantially co-planar.

In a further embodiment, the present invention provides a connector including a housing; an alignment sleeve disposed within the housing; a ferrule holder comprising a front piece and a back piece disposed within the alignment sleeve; and a multiple termination ferrule comprising a plurality of optical connection points coupled to the ferrule holder; wherein the ferrule holder is configured such that front piece of the ferrule holder and the ferrule pivot about a vertical axis of the ferrule holder and the ferrule pivots about a horizontal axis of the ferrule holder, and wherein the vertical axis and the horizontal axis of the ferrule holder are substantially co-planar. The connector also includes a substantially cylindrical spring and spring centering cuff disposed within the alignment sleeve that are configured to engage and transfer forces to the ferrule holder and the ferrule. The multiple termination ferrule comprises one or more guard fibers protruding from an end face of the multiple termination ferrule. The multiple termination ferrule also comprises one or more partitions that are configured to separate and receive stacked ribbons of a stack of optical fiber ribbons. The multiple termination ferrule further comprises a fin structure that is configured to receive and protect stacked ribbons of a stack of optical fiber ribbons.

BRIEF DESCRIPTION OF THE DRAWINGS

FIG. 4 is a partial, cut-away perspective view of a still further embodiment of the connector of the present invention, highlighting the use of a multi-fiber ferrule, a forward placed and enlarged shoulder, a short axis ferrule pivot point that is substantially co-axial with a long axis ferrule pivot point, and a substantially cylindrical force centering spring and spring centering cuff.

FIG. 5 is a perspective view of the multi-fiber ferrule, the two-piece, jointed ferrule holder, and the substantially cylindrical force centering spring and spring centering cuff of FIG. 4.

FIG. 6 is a planar side view of the multi-fiber ferrule, the two-piece, jointed ferrule holder, and the substantially cylindrical force centering spring and spring centering cuff of FIGS. 4 and 5.

FIG. 7 is another perspective view of the multi-fiber ferrule, the two-piece, jointed ferrule holder, and the substantially cylindrical force centering spring and spring centering cuff of FIGS. 4-6.

FIG. 14 is a perspective view of one more exemplary embodiment of the end face of the ferrule of the present invention, highlighting the use of guard fibers and ribbon partitioning.

FIG. 16 is a perspective view of one exemplary embodiment of the ferrule of the present invention, highlighting the use of protector fins.

DETAILED DESCRIPTION OF THE PREFERRED EMBODIMENTS

Reference is now made to preferred embodiments of the present invention, examples of which are illustrated in the accompanying drawings. Whenever possible, like reference numbers are used to refer to the same or like components/parts. It should be noted that the features of the receptacle and plug assembly disclosed could be applied equally to the receptacle portion or the plug portion of the receptacle and plug assembly. Thus, the generic term "connector" is used herein.

Figure 1:
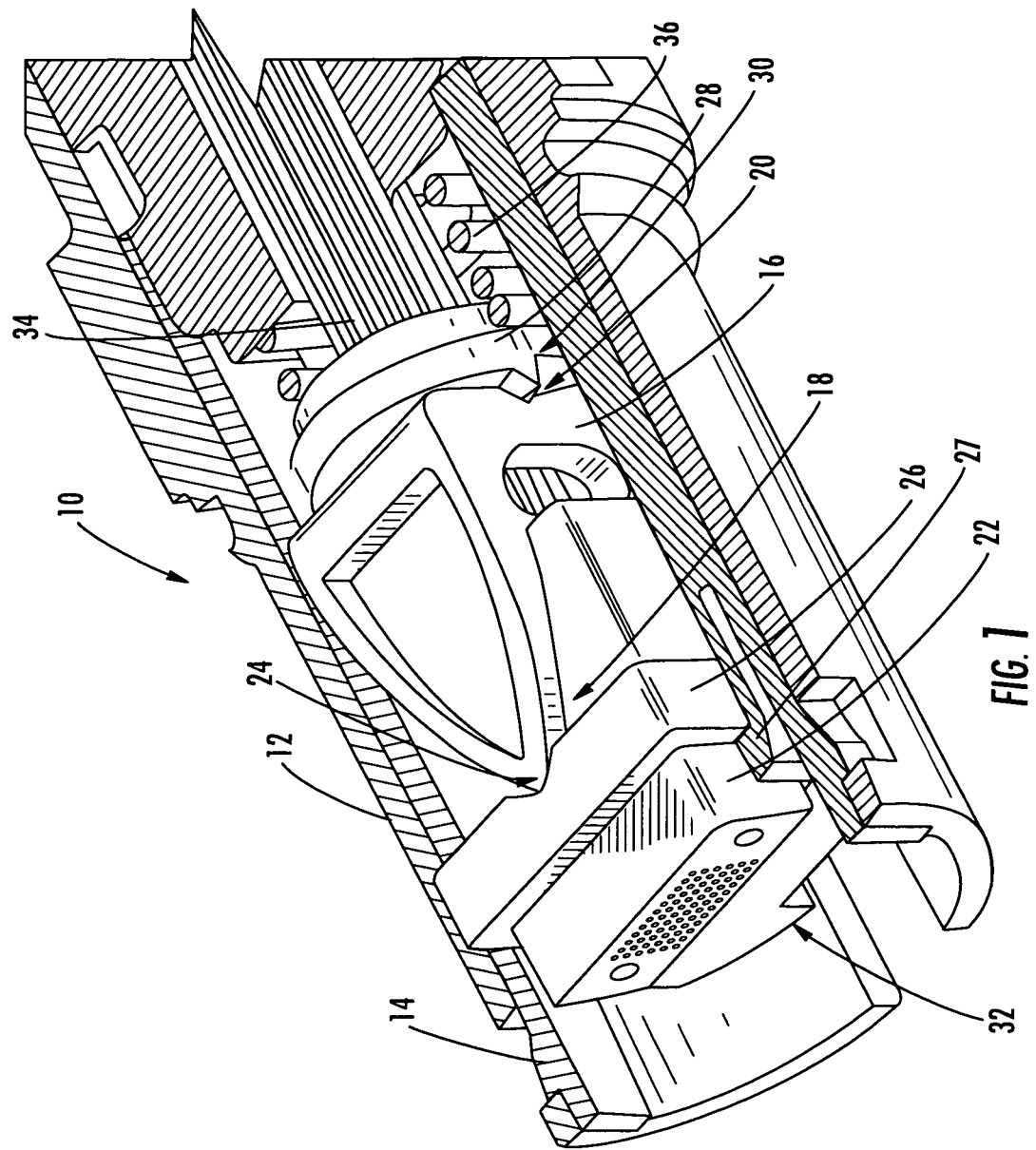
FIG. 1 is a perspective view of one embodiment of the connector of the present invention including a multi-fiber ferrule, a forward placed and enlarged shoulder, a short axis ferrule pivot point separated from a long axis ferrule pivot point, and a substantially cylindrical force centering spring and spring centering cuff.

Referring to FIG. 1, the connector 10 of the present invention includes a housing 12 and an alignment sleeve 14 disposed within and engaging the housing 12. A ferrule holder 16 is disposed within the alignment sleeve 14. The ferrule holder 16 includes a front pivot protrusion 18 and a back pivot recess 20. The front pivot protrusion 18 of the ferrule holder 16 is configured to engage a ferrule 22. Specifically, the front pivot protrusion 18 of the ferrule holder 16 is configured to engage a back pivot recess 24 of the back of a shoulder 26 of the ferrule 22. The front of the shoulder 26 of the ferrule 22 is configured to engage one or more retention members 27 of the alignment sleeve 14. The back pivot recess 20 of the ferrule holder 16 is configured to engage a spring centering cuff 28. Specifically, the back pivot recess 20 of the ferrule holder 16 is configured to engage a front pivot protrusion 30 of the front of the spring centering cuff 28. Collectively, the one or more retention members 27 of the alignment sleeve 14, the front pivot protrusion 18 of the ferrule holder 16, the back pivot recess 24 of the back of the shoulder 26 of the ferrule 22, the back pivot recess 20 of the ferrule holder 16, and the front pivot protrusion 30 of the front of the spring centering cuff 28 are configured to retain the ferrule 22 within the alignment sleeve 14, while allowing a degree of movement of the end face 32 of the ferrule 22 with respect to the short axis and the long axis of the ferrule 22, such that the ferrules of the receptacle and the plug may mate effectively. In the embodiment illustrated, the ferrule 22 is a multi-fiber ferrule, such as a 72-fiber ferrule or the like, the 72-fiber ferrule having 6 rows of 12 optical fibers each, for example, and that accommodates multiple stacks of fiber optic ribbon 34, as described in greater detail herein below. Ferrule extension in back eliminates the need for a boot and enhances fiber guide. Optionally, a ferrule boot may be utilized in this embodiment, as described in greater detail herein below. Finally, the spring centering cuff 28 is configured to engage a substantially cylindrical force centering spring 36, which also serves to stabilize the end face 32 of the ferrule 22 with respect to the short axis and the long axis of the ferrule 22, such that the ferrules of the receptacle and the plug mate effectively. It should be noted that the shoulder 26 of the ferrule 22 is forward placed and enlarged relative to the shoulder of a conventional ferrule, and that the short axis ferrule pivot point is separated from the long axis ferrule pivot point.

Figure 2:
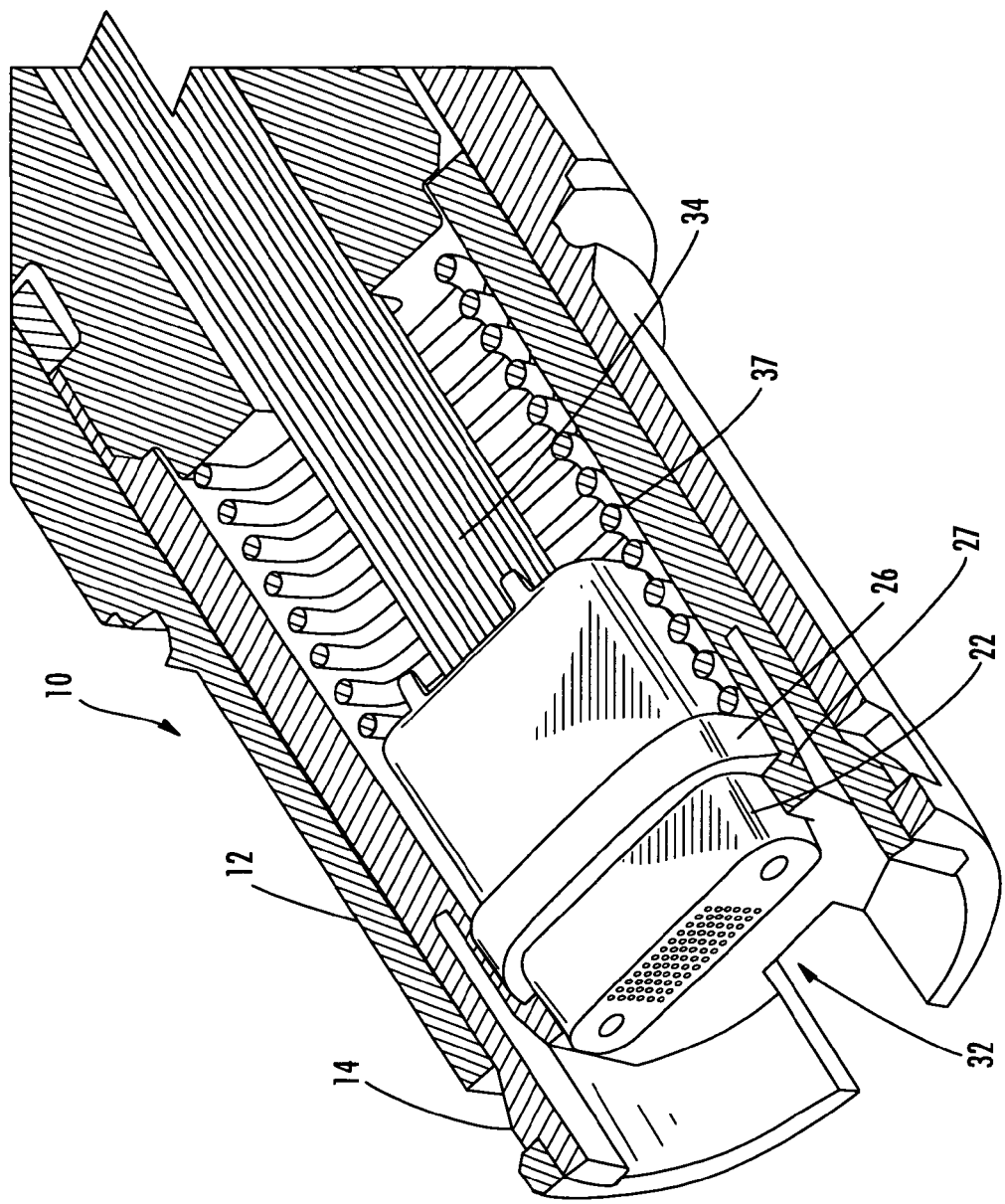
FIG. 2 is a perspective view of another embodiment of the connector of the present invention, highlighting the use of a multi-fiber ferrule, a forward placed and enlarged shoulder, and a substantially rectangular force centering spring.

Referring to FIG. 2, the connector 10 of the present invention again includes a housing 12 and an alignment sleeve 14 disposed within and engaging the housing 12. A substantially rectangular force centering spring 37 engages the shoulder 26 of the ferrule 22 and serves to stabilize the end face 32 of the ferrule 22 with respect to the short axis and the long axis of the ferrule 22, such that the ferrules of the receptacle and the plug may mate effectively. Collectively, the one or more retention members 27 of the alignment sleeve 14 and the substantially rectangular force centering spring 37 are configured to retain the ferrule 22 within the alignment sleeve 14, while allowing a degree of movement of the end face 32 of the ferrule 22 with respect to the short axis and the long axis of the ferrule 22, such that the ferrules of the receptacle and the plug mate effectively. In the embodiment illustrated, the ferrule 22 is a multi-fiber ferrule, such as a 72-fiber ferrule or the like, the 72-fiber ferrule having 6 rows of 12 optical fibers each, for example, and that accommodates multiple stacks of fiber optic ribbon 34, as described in greater detail herein below. It should again be noted that the shoulder 26 of the ferrule 22 is forward placed and enlarged relative to the shoulder of a conventional ferrule. The spring 37 may be a coil spring, wave washer style spring or other resilient member. Throughout all embodiments, the spring may also be a wire cut spring, symmetric wire cut spring or other spring capable of providing biasing force.

Figure 3:
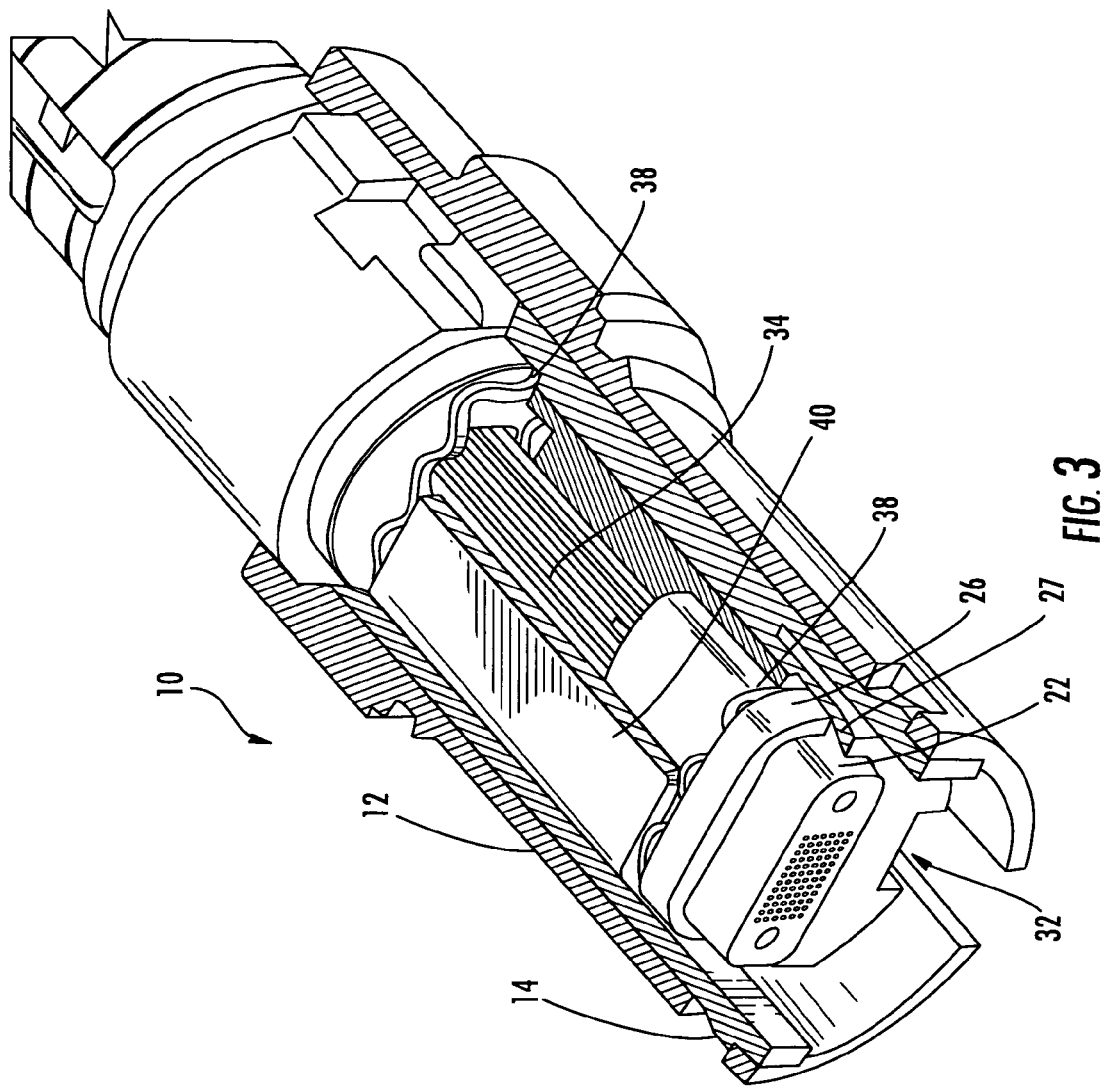
FIG. 3 is a perspective view of a further embodiment of the connector of the present invention, highlighting the use of a multi-fiber ferrule, a forward placed and enlarged shoulder, a pair of wave washer style springs, and a bridging sleeve.

Referring to FIG. 3, the connector 10 of the present invention again includes a housing 12 and an alignment sleeve 14 disposed within and engaging the housing 12. A pair of wave washers 38 and a bridging sleeve 40 engage the shoulder 26 of the ferrule 22 and serves to stabilize the end face 32 of the ferrule 22 with respect to the short axis and the long axis of the ferrule 22, such that the ferrules of the receptacle and the plug may mate effectively. Collectively, the one or more retention members 27 of the alignment sleeve 14, the pair of wave washers 38, and the bridging sleeve 40 are configured to retain the ferrule 22 within the alignment sleeve 14, while allowing a degree of movement of the end face 32 of the ferrule 22 with respect to the short axis and the long axis of the ferrule 22, such that the ferrules of the receptacle and the plug may mate effectively. In the embodiment illustrated, the ferrule 22 is a multi-fiber ferrule, such as a 72-fiber ferrule or the like, the 72-fiber ferrule having 6 rows of 12 optical fibers each, for example, and that accommodates multiple stacks of fiber optic ribbon 34, as described in greater detail herein below. It should again be noted that the shoulder 26 of the ferrule 22 is forward placed and enlarged relative to the shoulder of a conventional ferrule.

Referring to FIG. 4, the connector 10 of the present invention includes a housing (not illustrated) and an alignment sleeve 14 disposed within and engaging the housing. A two-piece, jointed ferrule holder 16 is disposed within the alignment sleeve 14. The two-piece, jointed ferrule holder 16 includes a front pivot point 42 which allows the two pieces of the two-piece, jointed ferrule holder 16 to rotate slightly in relation to one another with respect to the short axis of the ferrule 22. The front piece 43 of the two-piece, jointed ferrule holder 16 includes a pair of side pivot point holders 44 that are configured to engage a pair of side pivot point protrusions 46 associated with the ferrule 22, this configuration allowing the ferrule 22 to rotate slightly in relation to the two-piece, jointed ferrule holder 16 with respect to the long axis of the ferrule 22. In the embodiment illustrated, the pair of side pivot point holders 44 consists of a pair of closed loops 48 (see FIGS. 5 and 6) that fully encompass the pair of side pivot point protrusions 46 associated with the ferrule 22. The front of the shoulder 26 of the ferrule 22 is configured to engage the alignment sleeve 14. Collectively, the alignment sleeve 14, the front pivot point 42 of the two-piece, jointed ferrule holder 16, the pair of side pivot point holders 44 of the front piece 43 of the two-piece, jointed ferrule holder 16, the pair of side pivot point protrusions 46 associated with the ferrule 22, and the spring centering cuff 28 are configured to retain the ferrule 22 within the alignment sleeve 14, while allowing a degree of movement of the end face 32 of the ferrule 22 with respect to the short axis and the long axis of the ferrule 22, such that the ferrules of the receptacle and the plug may mate effectively. In the embodiment illustrated, the ferrule 22 is an angled physical contact (APC) multi-fiber ferrule, accommodating multiple stacks of fiber optic ribbon 34, as described in greater detail herein below. Finally, the spring centering cuff 28 is configured to engage a substantially cylindrical force centering spring 36, which also serves to stabilize the end face 32 of the ferrule 22 with respect to the short axis and the long axis of the ferrule 22, such that the ferrules of the receptacle and the plug may mate effectively. It should be noted that the shoulder 26 of the ferrule 22 is forward placed and enlarged relative to the shoulder of a conventional ferrule, and that the short axis ferrule pivot point is substantially co-axial with the long axis ferrule pivot point.

Referring to FIG. 7, the front pivot point 42 of the two-piece, jointed ferrule holder 16 which allows the two pieces of the two-piece, jointed ferrule holder 16 to rotate slightly in relation to one another with respect to the short axis of the ferrule 22 includes a front pivot point holder 49 associated with the back piece 50 of the two-piece, jointed ferrule holder 16 and a front pivot point protrusion 52 associated with the front piece 43 of the two-piece, jointed ferrule holder 16. To provide multiple ferrule examples, the multi-fiber ferrule shown in FIGS. 4 and 7 includes 2 rows of 12 fibers each, while the multi-fiber ferrule shown in FIG. 5 includes 2 rows of 8 fibers each.

Figure 8:
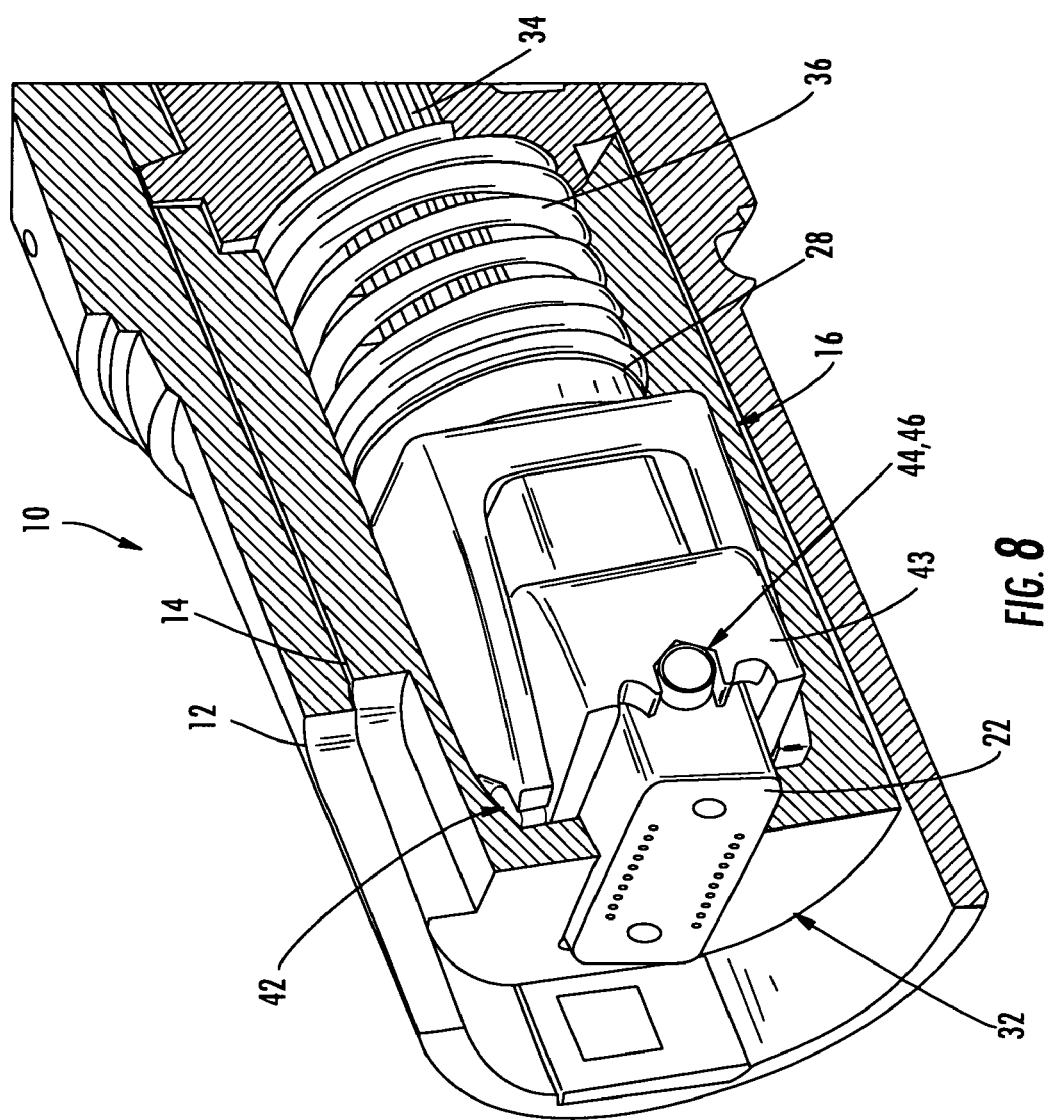
FIG. 8 is a partial, cut-away perspective view of a still further embodiment of the connector of the present invention, highlighting the use of a multi-fiber ferrule, a forward placed and enlarged shoulder, a short axis ferrule pivot point that is substantially co-axial with a long axis ferrule pivot point, and a substantially cylindrical force centering spring and spring centering cuff.

Referring to FIG. 8, the connector 10 of the present invention includes a housing 12 and an alignment sleeve 14 disposed within and engaging the housing 12. A two-piece, jointed ferrule holder 16 is disposed within the alignment sleeve 14. The two-piece, jointed ferrule holder 16 includes a front pivot point 42 which allows the two pieces of the two-piece, jointed ferrule holder 16 to rotate slightly in relation to one another with respect to the short axis of the ferrule 22. The front piece 43 of the two-piece, jointed ferrule holder 16 includes a pair of side pivot point holders 44 that are configured to engage a pair of side pivot point protrusions 46 associated with the ferrule 22, this configuration allowing the ferrule 22 to rotate slightly in relation to the two-piece, jointed ferrule holder 16 with respect to the long axis of the ferrule 22. In the embodiment illustrated, the pair of side pivot point holders 44 consists of a pair of partial loops 54 (see FIG. 10) that partially encompass the pair of side pivot point protrusions 46 associated with the ferrule 22. Collectively, the alignment sleeve 14, the front pivot point 42 of the two-piece, jointed ferrule holder 16, the pair of side pivot point holders 44 of the front piece 43 of the two-piece, jointed ferrule holder 16, the pair of side pivot point protrusions 46 associated with the ferrule 22, and the spring centering cuff 28 are configured to retain the ferrule 22 within the alignment sleeve 14, while allowing a degree of movement of the end face 32 of the ferrule 22 with respect to the short axis and the long axis of the ferrule 22, such that the ferrules of the receptacle and the plug may mate effectively. In the embodiment illustrated, the ferrule 22 is a multi-fiber ferrule, capable of accommodating multiple fiber optic ribbons 34, as described in greater detail herein below. Finally, the spring centering cuff 28 is configured to engage a substantially cylindrical force centering spring 36, which also serves to stabilize the end face 32 of the ferrule 22 with respect to the short axis and the long axis of the ferrule 22, such that the ferrules of the receptacle and the plug may mate effectively. It should be noted that, in this embodiment, the shoulder of the ferrule 22 is absent (see FIG. 9), and that the short axis ferrule pivot point is substantially co-axial with the long axis ferrule pivot point. By way of example, the multi-fiber ferrule shown in FIG. 8 includes 2 rows of 10 fibers each.

Figure 9:
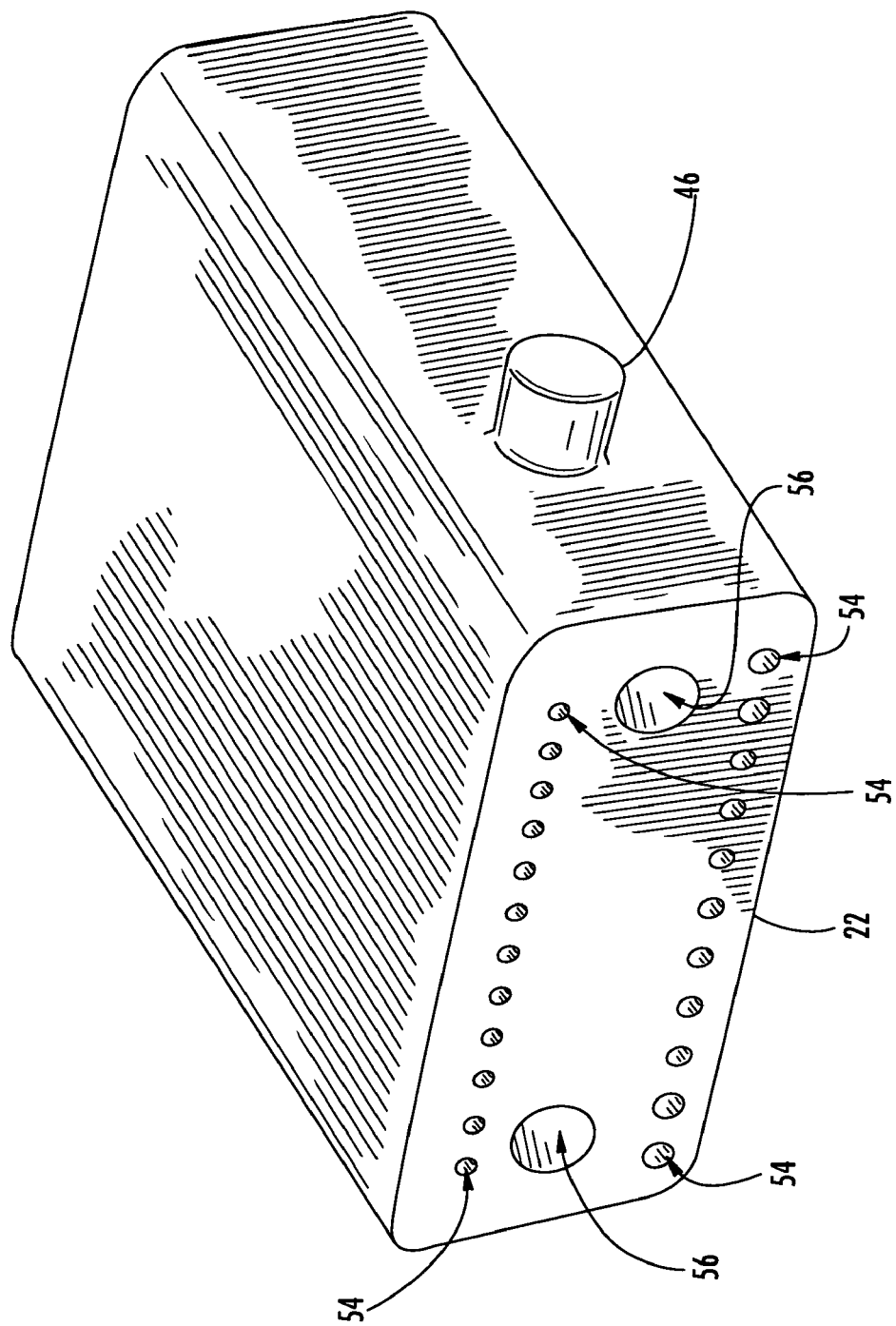
FIG. 9 is a perspective view of the multi-fiber ferrule of FIG. 8, incorporating a plurality of blind holes for the insertion of a plurality of guard fibers.

Referring to FIG. 9, the ferrule 22 of the present invention incorporates a plurality of blind holes 54 that are configured to receive a plurality of guard or "dummy" fibers (not illustrated), such as a plurality of 250 µm guard fibers or the like. These guard fibers have the most polishing induced error based on their location. By making the guard fibers optically non-functional, the polishing errors are kept from the main array. Advantageously, these guard fibers, disposed near the edges of the ferrule 22, ensure that all fibers are polished evenly, for example, providing "buffer" fibers near the edges of the ferrule 22. In addition, the guard fibers assist the fiber faces in touching with proper force when mated by keeping the overall optical fiber count relatively high and absorb undesirable optical fiber movement. Conventional multi-fiber connectors use the same spring force for optical fiber counts ranging from 2 to 24 optical fibers. At higher optical fiber counts, the per optical fiber loading is minimized. Below around 8 optical fibers, the loading become such that undesirable optical fiber movement takes place, as the spring force is too high. Thus, a relatively high overall optical fiber count is desirable. The guard fibers may also consist of steel fibers, fused quartz fibers, sapphire fibers, etc. The ferrule 22 also incorporates a pair of guide holes 56 that are configured to receive a pair of guide pins (not illustrated). These guide pins ensure that the ferrules of the receptacle and the plug mate effectively. Again, in this embodiment, the shoulder of the ferrule 22 is absent. By way of example, the multi-fiber ferrule shown in FIG. 9 includes 2 rows of 10 optically functioning optical fibers in each row.

Figure 10:
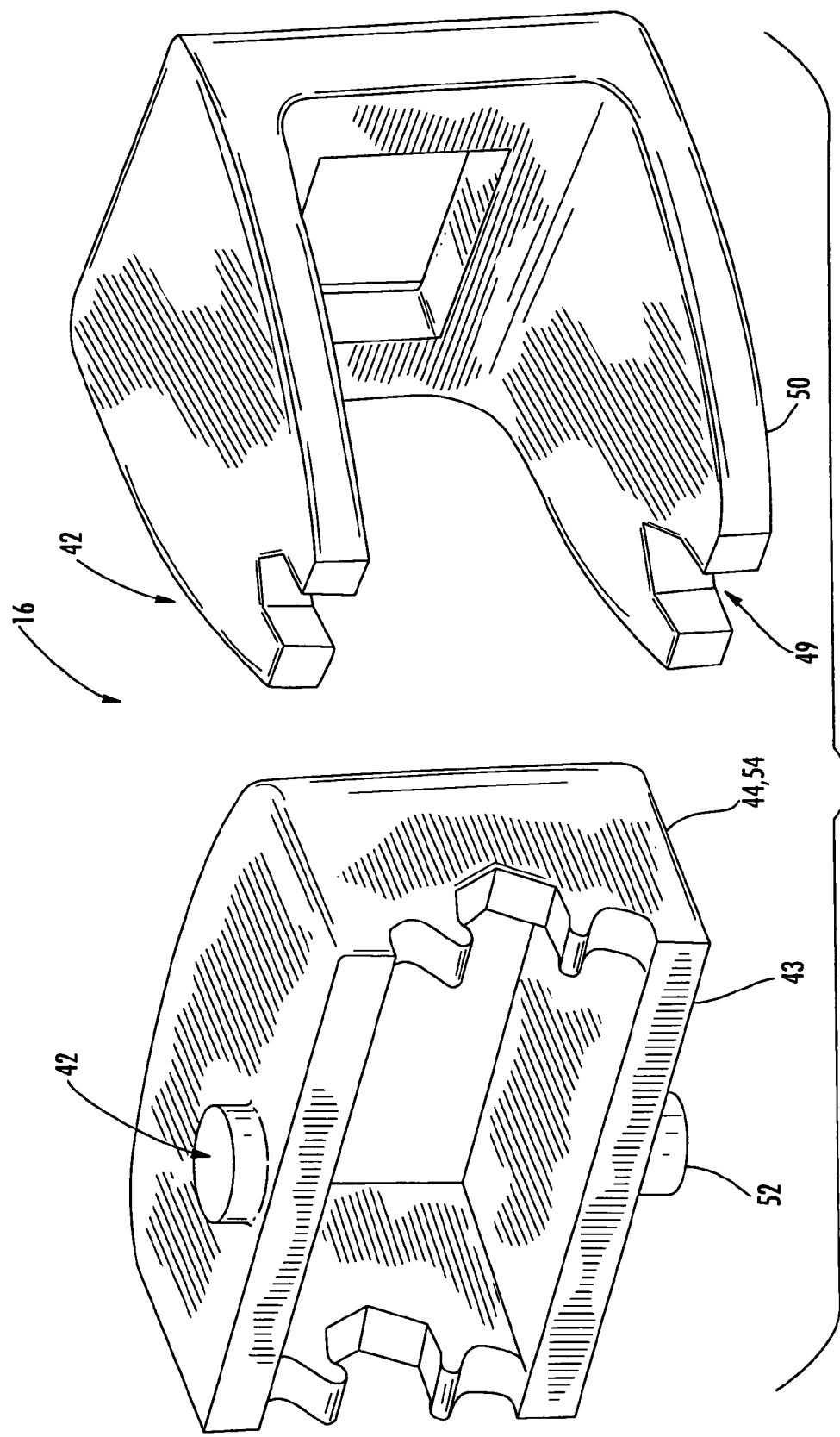
FIG. 10 is an exploded perspective view of the two-piece, jointed ferrule holder of FIG. 8.

Referring to FIG. 10, the two-piece, jointed ferrule holder 16 of FIG. 8 includes a front piece 43 and a back piece 50. The front pivot point 42 of the two-piece, jointed ferrule holder 16, which allows the two pieces of the two-piece, jointed ferrule holder 16 to rotate slightly in relation to one another with respect to the short axis of the ferrule 22 (FIG. 9), includes a front pivot point holder 49 associated with the back piece 50 of the two-piece, jointed ferrule holder 16 and a front pivot point protrusion 52 associated with the front piece 43 of the two-piece, jointed ferrule holder 16. During assembly, the front pivot point protrusion 52 "snappingly" engages the front pivot point holder 49, both at the top and bottom of the two-piece, jointed ferrule holder 16. The pair of side pivot point holders 44 consisting of a pair of partial loops 54 "snappingly" engage the pair of side pivot point protrusions 46 (FIG. 9) associated with the ferrule 22, thereby allowing the ferrule 22 to rotate slightly in relation to the two-piece, jointed ferrule holder with respect to the long axis of the ferrule 22.

Figure 11:
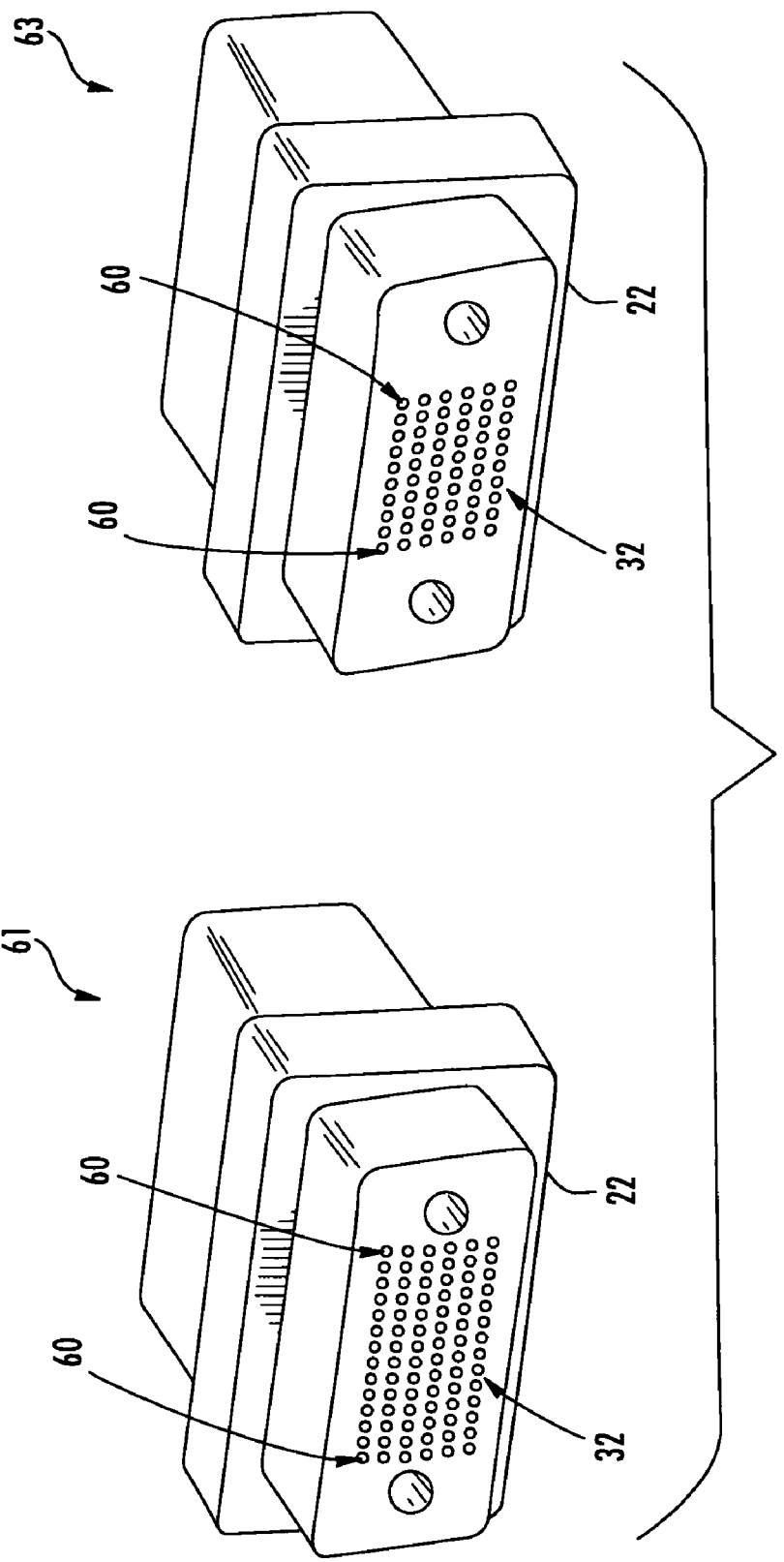
FIG. 11 is a perspective view of two exemplary embodiments of the end face of the ferrule of the present invention, highlighting the use of guard fibers.
Figure 12:
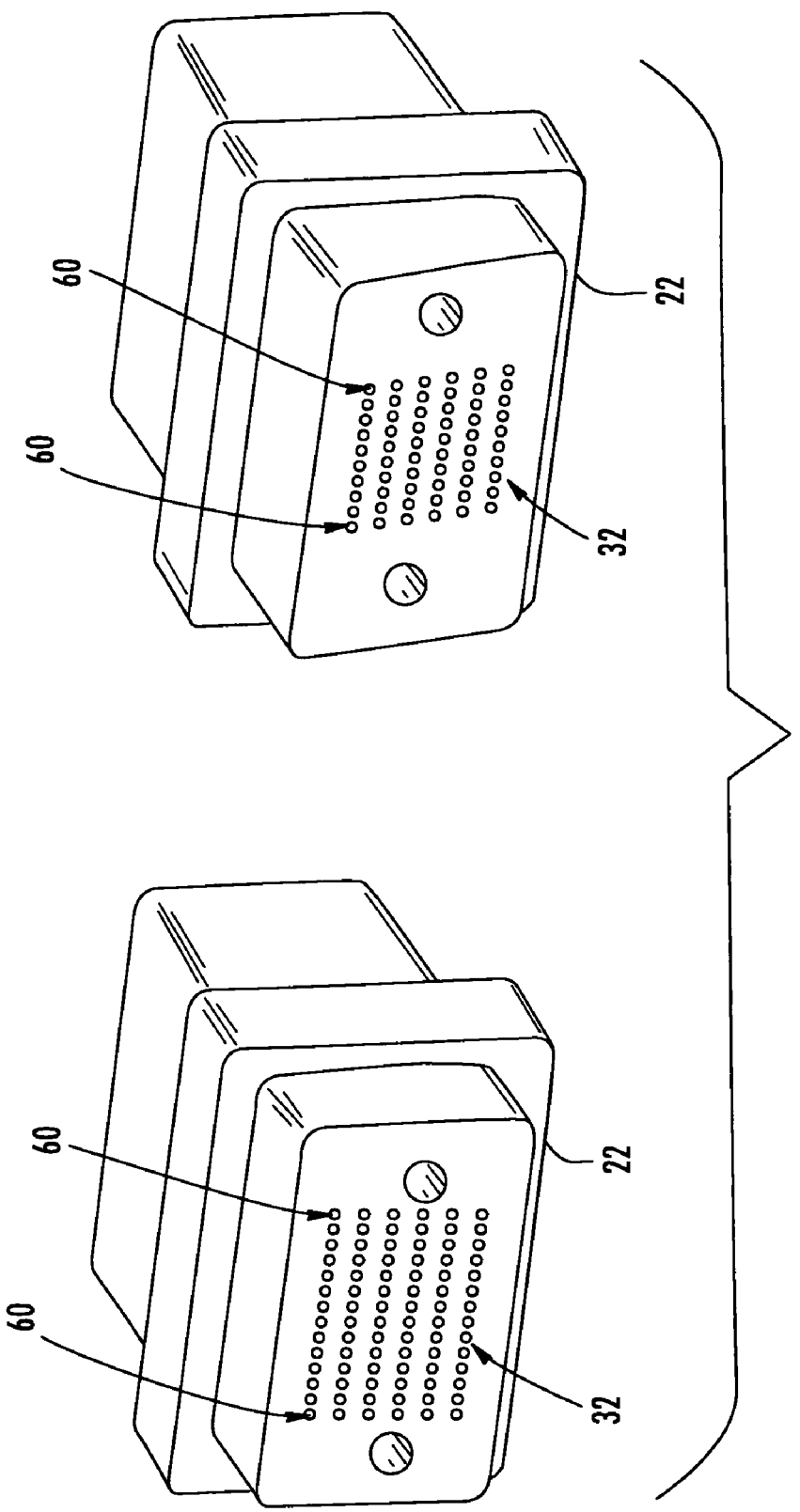
FIG. 12 is a perspective view of two more exemplary embodiments of the end face of the ferrule of the present invention, highlighting the use of guard fibers and ribbon partitioning.
Figure 13:
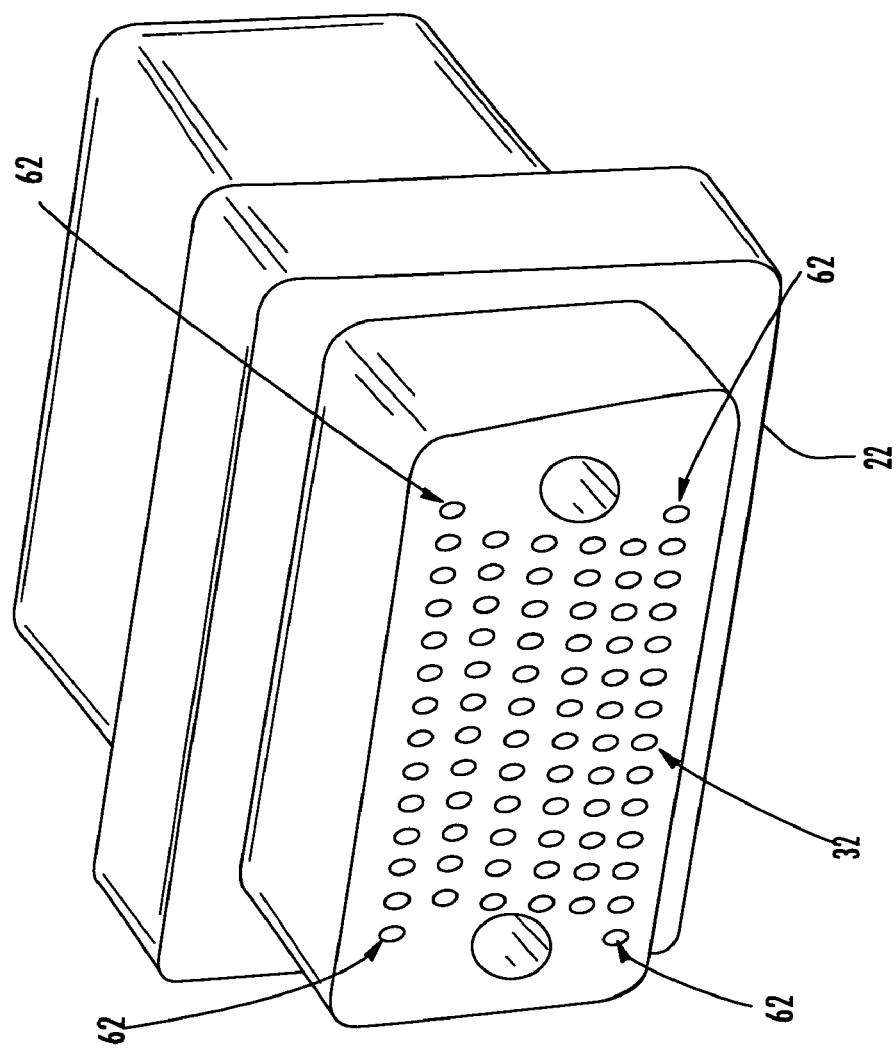
FIG. 13 is a perspective view of one more exemplary embodiment of the end face of the ferrule of the present invention, highlighting the use of guard fibers and ribbon partitioning.

Referring to FIGS. 11-14, the end face 32 of the ferrule 22 of the present invention may have a variety of configurations. Referring to FIG. 11, the ferrules 22 are multi-fiber ferrules, for example a 72-fiber ferrule 61 organized into 6 rows of 12 optical fibers each, or a multi-fiber angled physical contact ferrule 63 having a predetermined number of optical fibers, and that accommodates stacked ribbons. Extra columns of guard fibers 60 are added along the edges of the 6 rows of 12 optical fibers, thus providing 12 columns of optically functioning fibers and 2 columns of non-functioning guards. Referring to FIG. 12, the ferrules 22 are multi-fiber ferrules, such as a 72-fiber ferrule, a 48-fiber ferrule or the like, the 72-fiber ferrule having 6 rows of 12 optical fibers each and the 48-fiber ferrule having 6 rows of 8 optical fibers each, for example, and that accommodates partitioned ribbons. Extra columns of guard fibers 60 are added along the edges of the rows of optically functioning optical fibers. Referring to FIG. 13, the ferrule 22 is a multi-fiber ferrule, such as a 72-fiber ferrule or the like, the 72-fiber ferrule having 6 rows of 12 optical fibers each, for example, and that accommodates partitioned ribbons. Extra individual guard fibers 62 are added in the corners of the 6 rows of 12 optical fibers. Referring to FIG. 14, the ferrules 22 are multi-fiber ferrules, such as a 72-fiber ferrule or the like, the 72-fiber ferrule having 6 rows of 12 optical fibers each, for example, and that accommodates stacked or partitioned ribbons. Extra individual guard fibers or other guard structure is added at openings 64 to reduce the polishing induced errors.

Figure 15:
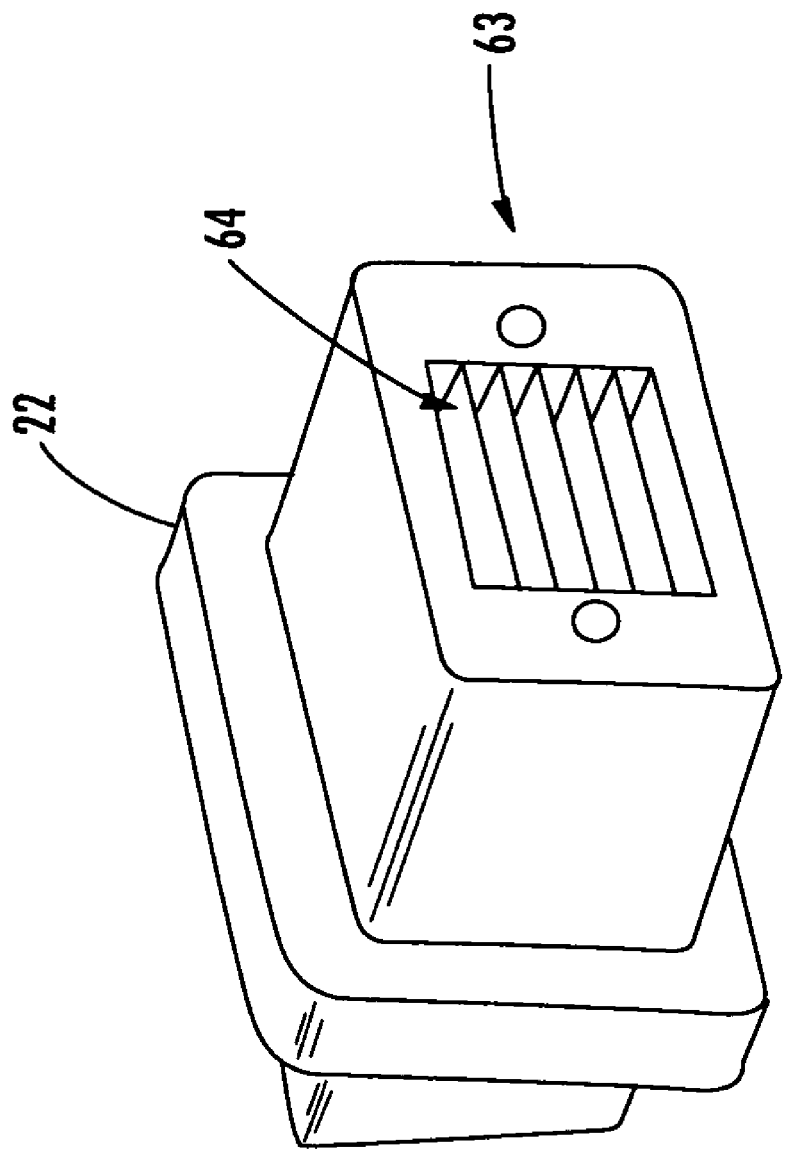
FIG. 15 is a perspective view of three exemplary embodiments of the rear portion of the ferrule of the present invention, highlighting the use of ribbon partitions.

Referring to FIG. 15, the rear portion 63 of the ferrule 22 of the present invention may include a plurality of substantially horizontal partitions 64 for dividing and holding the partitioned stack of optical fiber ribbons. These may be 100 µm or 200 µm partitions, for example.

Referring to FIG. 16, the rear portion 63 of the ferrule 22 of the present invention may also include a fin structure 70 that is configured to receive, retain, and maintain the stacked ribbons. Specifically, the fin structure 70 is configured to protect the guide pin holes 71 of the ferrule 22 from epoxy infiltration during stacked ribbon insertion and fixturing. The end face 32 of the ferrule 22 of the present invention may further include one or more bumper features 72 or the like.

In the embodiments described above, connector assemblies for preventing off-center force application which may load one end of the fiber array more than the other and ultimately cause some fibers to lose contact are provided. By relocating the force application from the back of the ferrule to the near center or front of the ferrule, radial forces caused by conventional designs and square coil springs are substantially reduced or eliminated. In the force centering embodiments shown, the joint attaches to the ferrule 22 and provides a spring seat about the other end. The attachment point forms the hinge in the x-axis while also delivering the y-axis component to nearly the center of the ferrule. The joint in the assemblies for the y-axis reduces the side component in the y-axis by allowing the spring to assume its natural angle. In several of the embodiments, the x-axis joint snaps into the ferrule and the front surface becomes the load bearing surface. Movement in the y-axis is limited by the ferrule geometry. The y-axis joint snaps both components of the assembly together and allows movement in the x-axis to reduce side components. Spring tilt may be limited by the cavity the assembly seats in to prevent direct force coupling to the back end of the ferrule with excessive out-of-squareness springs.

In the embodiments shown, and in other multi-fiber connectors with high fiber counts, it is important that the force application on the ferrule remain along the ferrule centerline. The mass of the large resulting ribbon stack may be enough to couple large forces to the ferrules. The forces may be large enough to overcome the force centering structure, thus these forces need to be prevented from being coupled to the ferrule.

One method for preventing force coupling is to break up the ribbon structure right behind the ferrule. This allows any forces present to dissipate in the loose fiber mass. One embodiment may include breaking the ribbon fibers down into single fibers. An alternative embodiment may include breaking the ribbon fibers down into groups of 2 or 4 fibers, among other groups. This would ensure the integrity of the force centering as described above even in cases where cable bending and torsion act to communicate forces through the ribbon stack.

It will be readily apparent to those of ordinary skill in the art that various modifications may be made to the preferred embodiments of the present invention without departing from the spirit and scope of the present invention. It is intended that the following claims cover all such modifications and their equivalents.

What is claimed is:

1. A fiber optic connector assembly, comprising:
   a connector housing;
   at least one multi-fiber ferrule maintained within the connector housing, the at least one multi-fiber ferrule defining a front end for presenting at least one optical fiber for optical connection with at least one other mating ferrule and a rear end for inserting the at least one optical fiber into the ferrule; and
   a biasing member maintained within the connector housing operable for providing a biasing force to the multi-fiber ferrule;
   wherein the biasing force is not applied to the rear end of the multi-fiber ferrule.

2. The connector assembly of claim 1, further comprising a ferrule holder positioned between the at least one multi-fiber ferrule and the biasing member, the ferrule holder defining a first end for seating the biasing member and a second end for contacting the at least one multi-fiber ferrule at one or more pivot points on the at least one multi-fiber ferrule.

3. The connector assembly of claim 2, wherein the ferrule holder includes a first component that is in pivotal contact with a second component.

4. The connector assembly of claim 2, wherein the at least one multi-fiber ferrule is substantially force centered and pivots about a vertical axis and a horizontal axis of the ferrule holder.

5. The connector assembly of claim 1, wherein the at least one multi-fiber ferrule defines a shoulder positioned about midway along a length of the ferrule.

6. The connector assembly of claim 5, wherein the biasing member seats on the shoulder of the at least one multi-fiber ferrule.

7. The connector assembly of claim 1, wherein the at least one multi-fiber ferrule includes at least one pair of pivot point protrusions.

8. The connector assembly of claim 1, wherein the at least one multi-fiber ferrule includes a first and a second pair of pivot point protrusions located in a common plane, wherein the first pair of pivot point protrusions provides pivoting about a first axis of the at least one ferrule and the second pair of pivot point protrusions provides pivoting about a second axis of the at least one ferrule.

9. The connector assembly of claim 1, further comprising an alignment sleeve positioned within the connector housing.

10. The connector assembly of claim 1, wherein the at least one multi-fiber ferrule is a 72 fiber ferrule.

11. The connector assembly of claim 1, wherein the at least one multi-fiber ferrule includes at least one non-optically-functional guard fiber.

12. The connector assembly of claim 1, wherein the rear end of the at least one multi-fiber ferrule defines at least one partitions defining at least one opening for receiving at least one fiber ribbon.

13. The connector assembly of claim 1, wherein the biasing member is a wave washer style spring.

14. The connector assembly of claim 1, wherein the biasing member is a substantially rectangular force centering spring.

15. The connector assembly of claim 1, wherein the assembly further comprises a stack of ribbon fibers, wherein the stack of ribbon fibers is separated into groups of optical fibers immediately behind the at least one multi-fiber ferrule.

16. A connector assembly, comprising:
    a connector housing;
    a multi-fiber ferrule disposed and aligned within the connector housing, the multi-fiber ferrule mounted upon the end of at least one fiber optic ribbon; and
    a force centering structure for applying on-axis force to other than the rear end of the multi-fiber ferrule.

17. The connector assembly of claim 16, wherein the force centering structure is at least one wave washer style spring.

18. The connector assembly of claim 16, wherein the force centering structure includes a ferrule holder positioned between the at least one multi-fiber ferrule and a biasing spring, wherein the ferrule holder includes at least one feature contacting the at least one multi-fiber ferrule and allowing the at least one multi-fiber ferrule to pivot relative to the ferrule holder.

19. The connector assembly of claim 16, wherein the force centering structure includes a ferrule holder positioned between the at least one multi-fiber ferrule and a biasing spring, wherein the ferrule holder includes a first component that attaches to the at least one ferrule and allows the at least one ferrule to pivot relative to the first component, and a second component that seats a biasing spring and allows the first component to pivot relative to the second component.

20. The connector assembly of claim 19, wherein pivot and force application are coaxial.

21. The connector assembly of claim 16, wherein the multi-fiber ferrule defines a shoulder positioned about midway along a length of the ferrule.

22. The connector assembly of claim 21, wherein the force centering structure seats on the shoulder of the multi-fiber ferrule.

23. The connector assembly of claim 16, wherein the multi-fiber ferrule includes at least one pair of pivot point protrusions.

24. The connector assembly of claim 16, wherein the multi-fiber ferrule includes a first and a second pair of pivot point protrusions substantially located in a common plane, wherein the first pair of pivot point protrusions provides pivoting about a first axis of the ferrule and the second pair of pivot point protrusions provides pivoting about a second axis of the ferrule.

25. The connector assembly of claim 16, further comprising an alignment sleeve positioned within the connector housing.

26. The connector assembly of claim 16, wherein the multi-fiber ferrule is a 72 fiber ferrule.

27. The connector assembly of claim 16, wherein the multi-fiber ferrule includes at least one non-optically-functional guard fiber.

28. A fiber optic connector assembly, comprising:
    a connector housing;
    an alignment sleeve disposed within the connector housing;
    a ferrule holder disposed within the alignment sleeve; and a multi-fiber ferrule comprising a plurality of connection points coupled to the ferrule holder;

wherein the ferrule holder is configured such that the ferrule pivots about a vertical axis and a horizontal axis of the ferrule holder.

29. The connector assembly of claim 28, wherein the vertical axis and the horizontal axis of the ferrule holder are substantially separated.

30. The connector assembly of claim 28, wherein the vertical axis and the horizontal axis of the ferrule holder are substantially co-planar.

31. The connector assembly of claim 28, wherein the ferrule holder comprises a front piece and a back piece, and wherein the front piece of the ferrule holder and the ferrule pivot about the vertical axis of the ferrule holder.

32. The connector assembly of claim 28, further comprising a plurality of alignment sleeve latches that are configured to engage and retain a shoulder of the ferrule.

33. The connector assembly of claim 28, further comprising a substantially cylindrical spring and spring centering cuff disposed within the alignment sleeve that are configured to engage and transfer forces to the ferrule holder and the ferrule.

34. The connector assembly of claim 28, further comprising a substantially rectangular spring disposed within the alignment sleeve that is configured to engage and transfer forces to a shoulder of the ferrule.

35. The connector assembly of claim 28, further comprising at least one wave washer style spring and a bridging sleeve disposed within the alignment sleeve that are configured to engage and transfer forces to a shoulder of the ferrule.

36. The connector assembly of claim 28, wherein the multi-fiber ferrule comprises at least one guard fibers protruding from an end face of the ferrule.

37. The connector assembly of claim 28, wherein the multi-fiber ferrule comprises at least one partition defining at least one opening, each opening for receiving at least one optical fiber ribbon.

* * * * *